(12) United States Patent
Mayau et al.

(10) Patent No.: US 6,874,542 B2
(45) Date of Patent: Apr. 5, 2005

(54) FLEXIBLE HOSE WITH CONNECT FLANGE AND METHOD FOR OBTAINING SAME

(75) Inventors: David Mayau, Tallende (FR); Guy Laurand, Pont du Chateau (FR)

(73) Assignee: Trelleborg Industrie, Clermont-Ferrand (FR)

( * ) Notice: Subject to any disclaimer, the term of this patent is extended or adjusted under 35 U.S.C. 154(b) by 149 days.

(21) Appl. No.: 10/415,907

(22) PCT Filed: Nov. 13, 2001

(86) PCT No.: PCT/FR01/03538
§ 371 (c)(1),
(2), (4) Date: May 5, 2003

(87) PCT Pub. No.: WO02/44607
PCT Pub. Date: Jun. 6, 2002

(65) Prior Publication Data
US 2004/0035484 A1 Feb. 26, 2004

(30) Foreign Application Priority Data
Dec. 1, 2000 (FR) .......................................... 00 15557

(51) Int. Cl.$^7$ ................................................. F16L 9/00
(52) U.S. Cl. ....................... 138/109; 138/120; 138/155; 285/413; 285/222.2; 285/222.4
(58) Field of Search ................................ 138/109, 120, 138/155, 104; 285/413, 412, 222.1–222.5, 368

(56) References Cited

U.S. PATENT DOCUMENTS

| | | | | | |
|---|---|---|---|---|---|
| 2,146,218 | A | * | 2/1939 | Kimmich et al. | ......... 285/222.2 |
| 3,453,008 | A | * | 7/1969 | Daniel | ...................... 285/222.4 |
| 4,123,088 | A | * | 10/1978 | Tanaka | .......................... 285/14 |
| 4,950,001 | A | * | 8/1990 | Briggs | ....................... 285/222.1 |
| 5,443,099 | A | * | 8/1995 | Chaussepied et al. | ....... 138/109 |
| 2004/0066035 | A1 | * | 4/2004 | Buon et al. | ............... 285/222.2 |

FOREIGN PATENT DOCUMENTS

| | | |
|---|---|---|
| FR | 1 480 225 | 7/1967 |
| GB | 1 527 767 | 10/1978 |
| GB | 2 018 936 | 10/1979 |

* cited by examiner

*Primary Examiner*—Patrick Brinson
(74) *Attorney, Agent, or Firm*—Young & Thompson

(57) ABSTRACT

A flexible hose with connect flange and a method for obtaining such a hose. The flexible hose (1) whereof the elastomer wall (1a) is reinforced by at least a main carcass (2) comprises flexible cables, including at least at one of its ends an annular flange (3), provided with longitudinal perforations, whereto is fixed at least the main carcass, the flange having an external diameter not greater than the external diameter of the hose wall proximate to the flange. The flange comprises perforations (34a) emerging on one or more indentation(s) (12) provided on the outer surface (9) of the hose wall and whereof the dimensions enable to house therein at least linking elements (15) externally accessible for abutting connection of pipes without interposition of an intermediate component between their respective flanges.

17 Claims, 5 Drawing Sheets

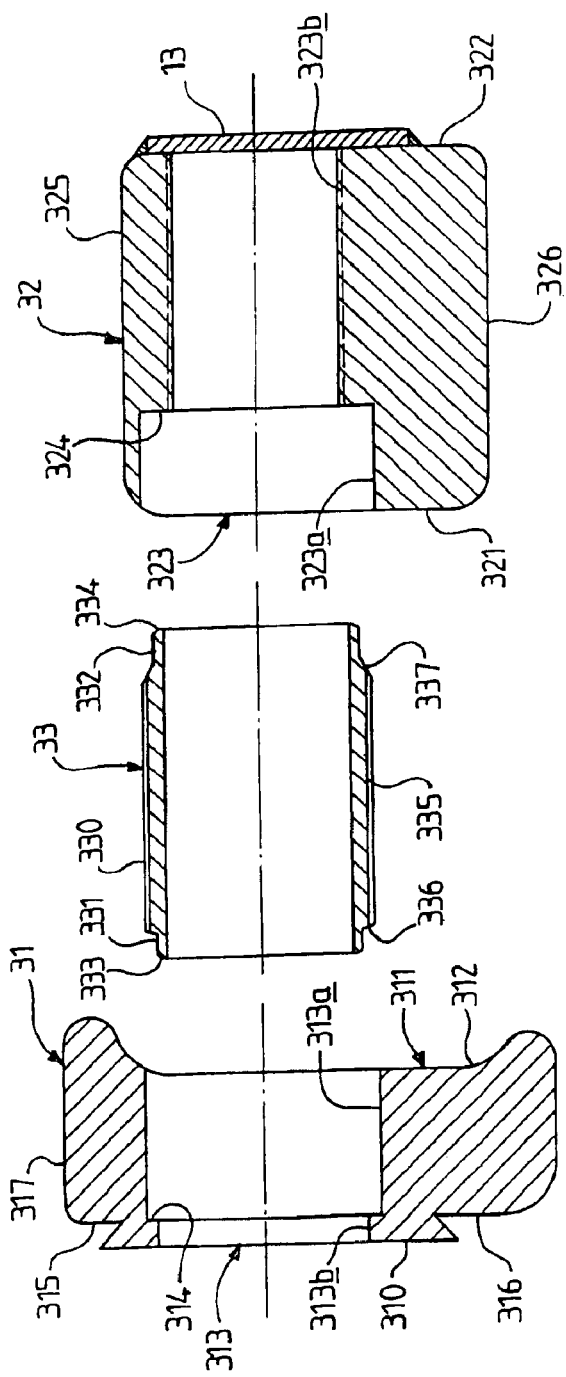
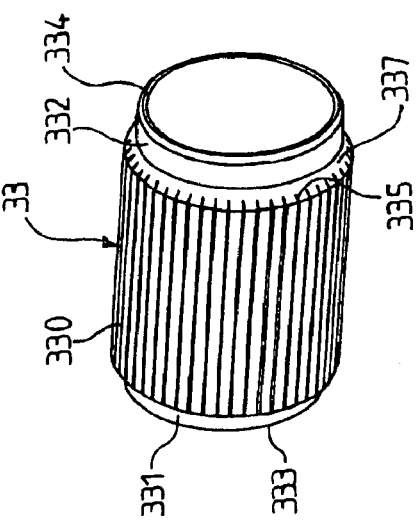
FIG.3A
FIG.3B

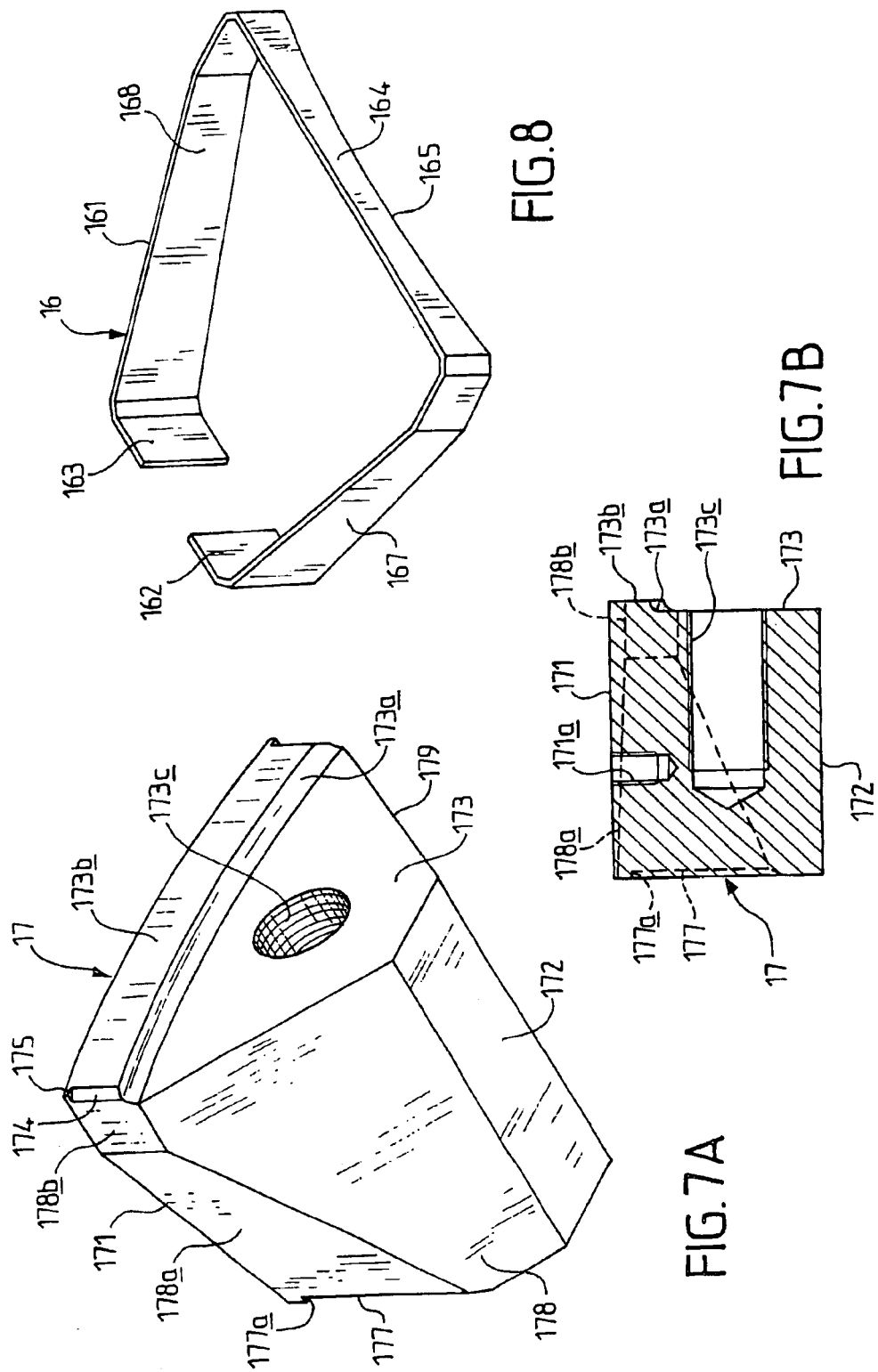

FLEXIBLE HOSE WITH CONNECT FLANGE AND METHOD FOR OBTAINING SAME

The present invention relates to a flexible hose with connecting flange and a process for obtaining the same.

The invention relates more particularly to a flexible hose used to establish pliable transport lines, serving to load/unload the cargo of oil tankers, from a fixed or relatively mobile installation, or to link two oil installations, at least one of which is mobile, the mobile installations being, for example, installations exposed to the swell and/or the tide.

In order to facilitate the production, transport and installation thereof, such hoses, the internal diameter of which can exceed 600 mm, are produced in 6 to 15 meter lengths and are provided at their ends with connecting flanges to enable them to be joined to one another and/or to an oil installation.

Such hoses are subjected to various high stresses resulting especially from the internal pressure of the transported fluid and from movements and deformations of the line. These hoses must exhibit a range of properties, such as resistance to the internal pressure of the delivery of the fluid, resistance to longitudinal traction, resistance to crushing, resistance to bending-induced fatigue and to torsional forces, good flexibility combined with resistance to ovalization to prevent the hose from fracturing when flexed.

In order to obtain such properties, it is known, especially by virtue of patent applications U.S. Pat. Nos. 1,480,225 and 2,418,900, to use reinforcement or carcass plies, made of pliable and strong metallic or textile cords divided into pairs of plies mutually separated by a layer of rubber, as well as "integrated" connecting flanges, constituted by at least two annular elements nesting partially one inside the other and enclosing between them the radially erect ends of the metallic plies of at least one carcass. The flanges are positioned at the ends of the tube prior to the vulcanization of the elastomer wall of the hose, the vulcanization ensuring the integration of the whole. The hose comprises a main carcass intended to bear the internal pressure of the fluid and in which the plies of each pair are constituted by parallel metallic cords orientated obliquely in opposite directions in the one and the other plies according to angles proximate to the angle of equilibrium. A secondary carcass constituted by pairs of plies of metallic or textile cords according to angles greater or less than 55° confers the required bending properties. In order to supplement and/or replace the secondary carcass, it is known to utilize metallic reinforcing rings or a helical armoring.

According to a first type of flange revealed in the two aforesaid patent applications, the flange possesses a diameter greater than the wall of the hose. The prominent annular part of the flange comprises longitudinal through-bores enabling the hoses to be connected by means of nuts and bolts. It has been shown that a hose provided with such a flange does not have sufficient resistance for certain applications, especially for connecting the hose to a fixed point. In this case, the flange is actually subjected to high traction and bending forces and ruptures of the hose have been discovered at the junction of the hose with the base of the prominent annular part of the flange. Moreover, for the installation of a line, it is desirable to be able to wind the joined-up hoses onto a reel. In order to allow take-up on the reel and to avoid all contact between the flanges and the reel, it is necessary to provide rubber bosses at the level of the flanges.

In order to replace this first type of flange, a hose has been proposed which has a conical or cylindrically conical exterior shape at its ends, in order to confer a variation in regular rigidity, and provided with a second type of flange, of outer diameter less than the diameter of the hose, a flange of this kind being revealed in patent application U.S. Pat. No. 2,418,900. Owing to this flange configuration, reinforcement plies can be bent radially inward for the outer plies and outward for the inner plies at the level of the flange, said flange serving to fix said bent plies. Thus, the strength of the hose at the level of the connection is reinforced. Nevertheless, from its front connecting face, such a flange has longitudinal dummy bores, which require the use of an intermediate component in order to connect the flanges of two successive hoses.

The object of the present invention is to propose a hose with connecting flange which is strong and whose connection to another hose is realized without an intermediate component and such that joined-up hoses can be taken up on a reel.

This object is achieved by the fact that the flexible hose according to the invention, the elastomer wall of which is reinforced by at least one main carcass containing pliable cords and which comprises at one at least of its ends an annular connecting flange, provided, from its transversely external end surface, with longitudinal bores, to which flange at least the main carcass is fixed, said flange having an outer diameter less than or equal to the outer diameter of the wall of the hose proximate to the flange, is characterized in that the flange comprises bores, "emerging" bores, which emerge on one or more indentations made on the outer surface of the wall of the hose and the dimensions of which allow at least one externally accessible coupling means to be housed there, for connecting hoses end to end without any intermediate component interposed between their respective flanges.

According to one particularity, each emerging bore emerges on a separate indentation.

According to one embodiment, the flange comprises "non-emerging" bores, which do not emerge on an indentation and which are tapped over at least a part thereof for the screwing of a complementary threaded rod of the aforesaid coupling means, the emerging bores being untapped.

In one particular embodiment, the emerging bores and the non-emerging bores are alternately and peripherally distributed over the end surface of the flange.

Advantageously, the non-emerging bores contain a bottom separating said bores from the wall of the hose and constitute dummy bores of the flange.

Advantageously, at least a part of the walls of the indentations is lined with a sealing strip by which contact of a carcass with the exterior can be prevented.

According to one embodiment, the main reinforcement carcass is formed by one or more pairs of concentric plies radially spaced by layers of elastomer, each pair being constituted by two elastomer plies and parallel metallic cords orientated obliquely in the opposite direction in the one and the other ply such as to form angles of 20° to 70° relative to the axis of the hose.

According to one particularity, the hose comprises a secondary reinforcement carcass of greater diameter than the main carcass and radially spaced toward the outside of the latter by a layer of elastomer, said secondary carcass comprising concentric plies of elastomer and of metallic and/or textile cords, joined directly to one another and/or spaced by layers of elastomer, the cords of the main carcass forming angles substantially equal to the angle of equilibrium, while the cords of the secondary carcass form angles between 20° and 70°.

Advantageously, the flange comprises at least two axially joined-annular elements, a longitudinally external element and a longitudinally internal element, each provided with coaxial holes forming at least a part of the aforesaid bores, at least the internal element possessing an internal diameter less than or equal to the main carcass and at least the main carcass being radially bent, the radial part thus bent being interposed and fixed between the two elements of the flange.

According to one particularity, the hose has, close to the flange, a conical exterior shape, with an increase in thickness in the direction of the flange, obtained by increasing the thickness of an elastomer layer and/or insertion of an elastomer layer and/or of plies between plies of a carcass.

Advantageously, the radial bent part of the main carcass extends radially beyond at least the longitudinally internal element of the flange and is bent longitudinally at a distance from the end of the hose, at least a part of the plies which constitute it being interposed between the plies of the secondary carcass so as to fix these latter to the flange via the plies of the main carcass.

According to one particularity, the hose comprises, close to the flange, longitudinal-reinforcement plies, comprising cords arranged substantially parallel to the axis of the hose, said plies being joined to the flange and to the main carcass and/or to the secondary carcass.

Advantageously, the reinforcement plies have diameters greater than that of the plies of the main carcass and less than that of the plies of the secondary carcass and are joined together and joined to the main carcass, at least one of the plies having its double-bent end connected to at least one ply of the secondary carcass.

Advantageously, the flange comprises tubular elements inserted at least partially in the coaxial holes of the longitudinally internal and external elements and the external surfaces of which are lined at least partially with elastomer to ensure that the leak-tightness of the flange at the level of said bores and to guarantee that the various elements of the flange are strongly joined.

According to one particularity, the hose comprises metallic rings or a helical metallic armoring embedded in the layer of elastomer contained between the main carcass and the secondary carcass.

Another object of the invention is to propose a process for obtaining such a hose.

This object is achieved by the fact that the process for obtaining a flexible hose according to the invention comprises a step for fixing cores against the transversely internal surface of the flange at the level of at least certain of the longitudinal bores, a step for positioning and adjusting the flange at the end of the hose, said cores being prominent relative to the outer surface of the wall, made of crude non-vulcanized elastomer, of the hose, or having a surface lying substantially flush with said outer wall surface, and a step for removing these cores after the elastomer has been vulcanized.

According to one particularity, the process according to the invention comprises a step for fitting the sealing strip onto the cores, said strips remaining stuck to the vulcanized elastomer wall of the indentations after the cores are removed.

The invention will be better understood and other objects, details, characteristics and advantages will appear more clearly in the course of the following detailed explanatory description of a currently preferred particular embodiment of the invention, with reference to the appended schematic drawing, in which:

FIG. 3A represents an exploded view, in longitudinal section, of various elements constituting a flange of the hose according to the invention, at the level of a non-emerging bore;

FIG. 3B represents a perspective view of a tubular element of a flange of the hose according to the invention;

Figure 6B:
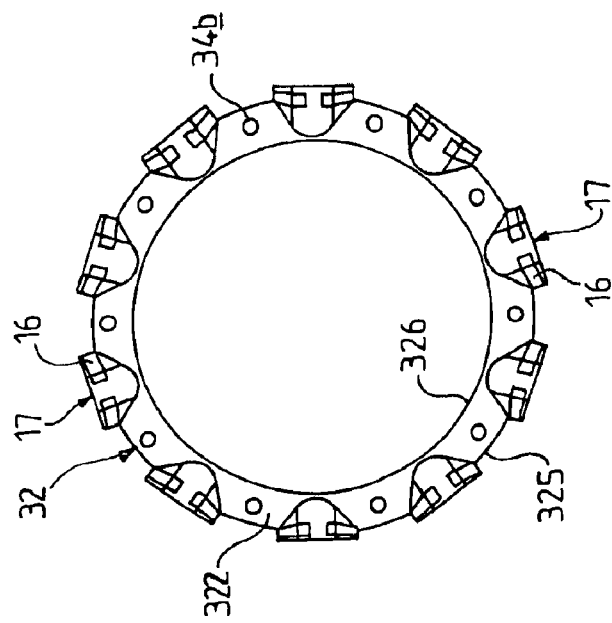
Figure 6A:
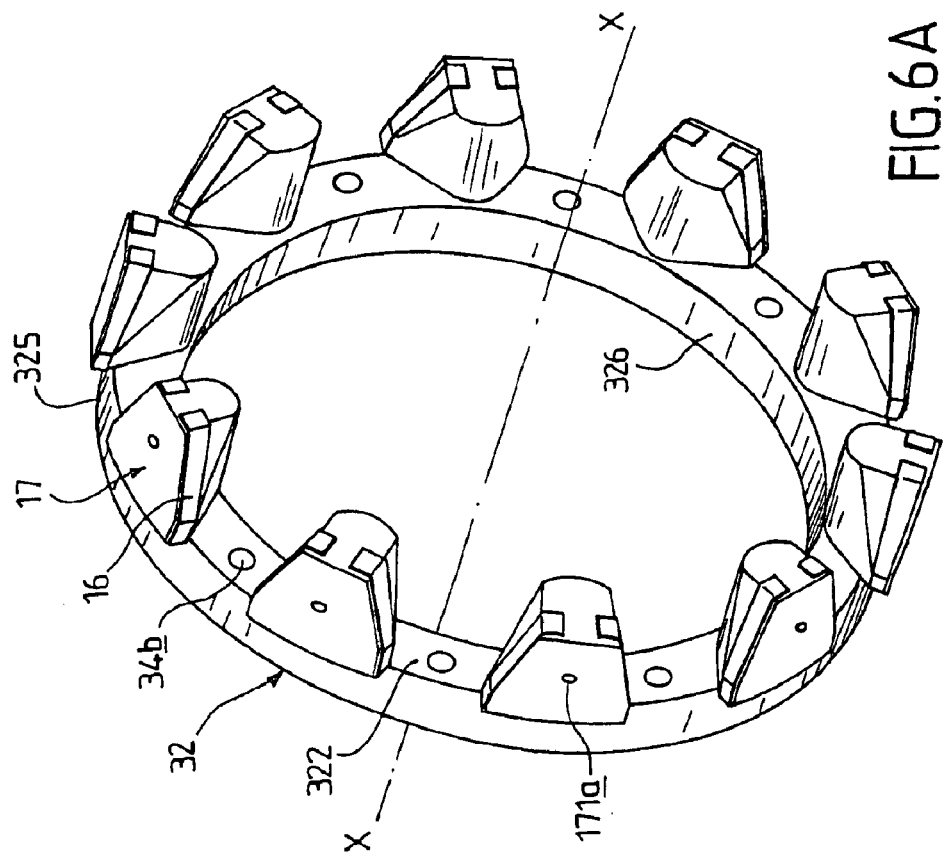

FIGS. 6A and 6B respectively represent a perspective view and a rear view of the internal element of a connecting flange according to the invention, illustrating the positioning of molding cores for the process for obtaining a hose according to the invention;

FIGS. 7A and 7B represent, respectively, a perspective view and a sectional view of a molding core used in the process for obtaining a hose according to the invention;

FIG. 8 represents a perspective view of a sealing strip intended to be placed against the wall of an indentation of the outer surface of the hose.

Figure 1:
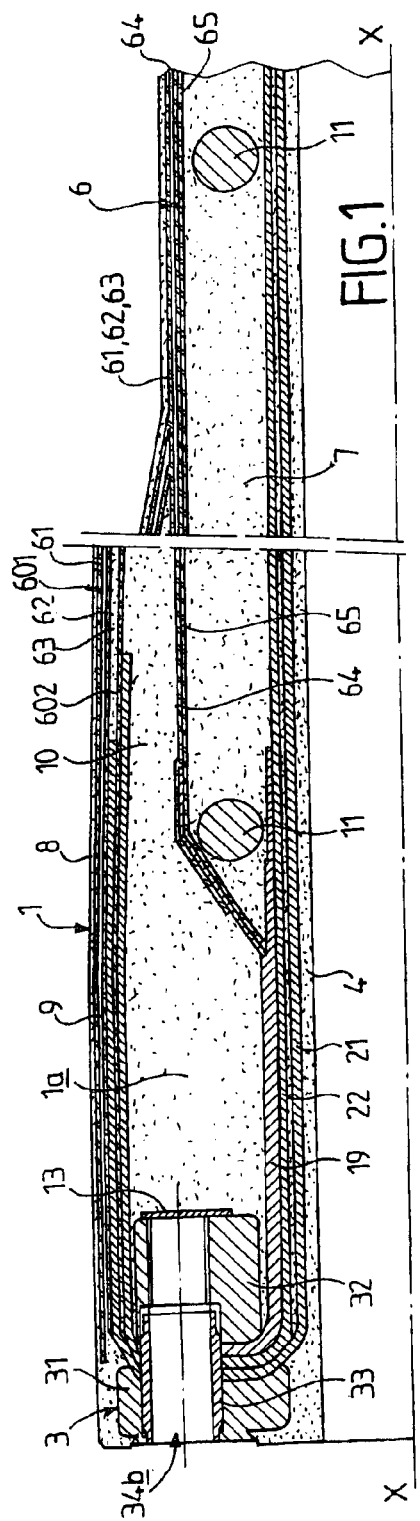
FIG. 1 represents a partial half-view, in axial section, of one end of a hose according to the invention at the level of a non-emerging bore.
Figure 2:
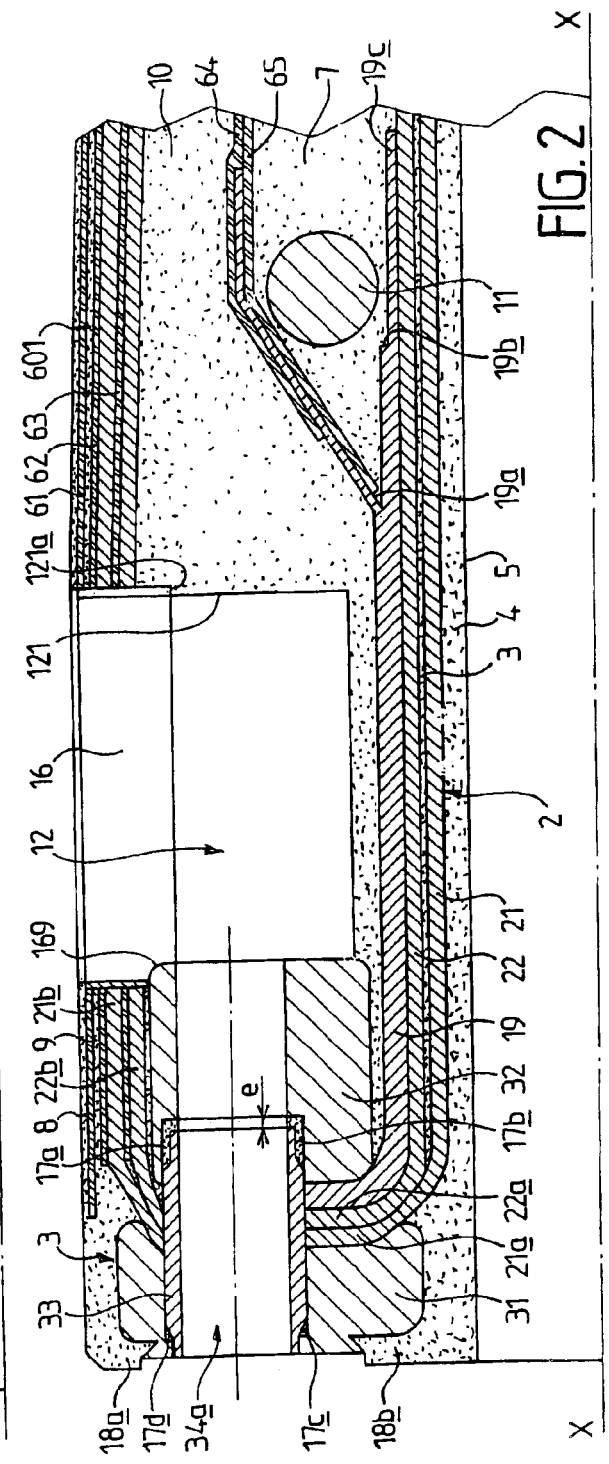
FIG. 2 represents a partial half-view, in axial section, of one end of a hose according to the invention at the level of an emerging bore.

With reference to FIGS. 1 and 2, the hose 1 comprises a wall 1a, which is substantially cylindrical along a main axis X and is made of elastomer, such as vulcanized rubber or a similar pliable material, and which is reinforced by a main carcass 2 formed by at least two pairs 21, 22 of coaxial plies. In the remainder of the description, the term "rubber" refers to any type of elastomer suitable for constituting the various layers of the wall 1a, the nature of the rubber being able, in a known manner, to be different from one layer to the other. The plies of each pair 21, 22 are applied substantially one against the other and are constituted by parallel metallic cords embedded in a film of rubber, the cords being orientated obliquely in opposite directions in one and the other plies of a pair. The pairs 21, 22 are radially spaced apart by a layer of rubber 3. The pair 21 of plies of lesser diameter is internally lined by an inner layer of rubber 4 forming the internal surface 5 of the hose.

The wall 1a of the hose is reinforced by a secondary carcass 6, which is radially spaced relative to the main carcass by a layer of rubber 7, said secondary carcass comprising concentric plies 61–65 constituted by metallic or textile cords embedded in a film of rubber. The plies are applied directly one to the other and/or are radially spaced by layers of rubber. The ply 61 of greater diameter is externally lined by an external layer 8 of rubber forming the external surface 9 of the hose. In the exemplary embodiment illustrated, the secondary carcass 6 comprises a first set of two plies 64, 65 applied directly one upon the other and comprising, for example, metallic cords. This first set is spaced radially inward by a layer of rubber 10 of a second set of three plies 61–63 of larger diameters, each constituted, for example, by textile cords embedded in a film of rubber. These three latter plies 61–63 applied directly one against the other are spaced apart by layers of rubber 601, 602 close to the flange, such as is described below.

The twilled cords of the plies of the main 2 and secondary 6 carcass can form an angle of between 20° and 70° relative to the axis X of the hose. The twilled cords of the pairs 21, 22 of the main carcass preferably form an angle close to the angle of equilibrium, i.e. 55°. The main carcass 2 is thus mainly intended to bear the internal pressure of the conveyed fluid. The traction forces are borne both by the main carcass 2 and by the secondary carcass 6. The angles of the cords of the plies 61–65 of the secondary carcass are adjusted as a function of the properties sought. In order to increase the resistance of the hose to traction forces, the angle of these cords is reduced relative to the angle of equilibrium. The angle of these cords can also be increased to enhance the flexibility of the hose. The hose can further comprise rigid rings 11 or a helical armoring of constant or variable pitch, disposed in the elastomer layer 7 contained between the main carcass 2 and the secondary carcass 6. These rings 11 serve to support the carcasses when these are subjected to tensile stress and also allow improvement to the crushing resistance of the hose.

The hose comprises, at one at least of its ends, a connecting flange 3, to which at least the main carcass 2 is fixed. With reference to FIG. 3A, the flange comprises two partially nestable annular elements, a longitudinally external element 31, comprising an external surface 310, constituting the transversely external end surface of the flange, and an internal clamping surface 311 and a longitudinally internal element 32, comprising a clamping surface 321, an internal surface 320 constituting the transversely internal surface of the flange. Said elements, hereinafter referred to as the external element 31 and the internal element 32, comprise concentrically distributed longitudinal through-holes 313, 323. When the two elements are partially nested, with their clamping surfaces 311, 321 facing each other, the holes of the elements are arranged coaxially to form flange-connecting bores 34a, 34b. The external element 31 has an external diameter and an internal diameter smaller, respectively, than the external and internal diameters of the wall 1a of the hose. The internal element 32 has internal and external diameters smaller than those of the external element 31 and the external element comprises on its internal clamping surface 311 an annular groove 312, in which the internal element nests. According to one particular embodiment, connecting sockets 33 are partially fitted in the holes 313, 323 of the elements in order to facilitate the assembly of the flange, to ensure a strong fastening between the two elements and to prevent the infiltration of water through said holes. The two pairs 21, 22 of the main carcass are bent radially outward, the bent parts 21a, 22a thus formed are applied one against the other, without an intermediate rubber layer, and are interposed and fixed between the annular elements 31, 32 of the flange, distorting the connecting sockets 33.

By way of example, the holes 313 of the external element 31 have a first part 313a extended by a second part 313b of smaller diameter, emerging on the outer surface 310 of the element, a shoulder 314 being formed which is orientated in the same direction as the internal surface of the element. The holes 323 of the internal element 32 have a first part 323a emerging on the clamping surface 321, of diameter equal to the first part 313a of the external element, and is extended by a second part 323b, a shoulder 324 being formed which is orientated in the same direction as the clamping surface. The connecting sockets 33 have an internal diameter substantially equal to that of the second part 323b of the holes of the internal element and an outer diameter substantially equal to that of the first parts 313a, 323a. The outer surface of the connecting sockets contains at the ends circular indentations 331, 332 extending as far as the circular edges 333, 334 of the connecting sockets and forming oblique shoulders 336, 337. The external diameter of the connecting sockets at the level of at least one of the indentations is less than or equal to the diameter of the second part 313b of the external element. In order to carry out the assembly of the flange, the connecting sockets are lined with raw rubber, then inserted by force into the external and internal elements until the circular edges 333 of the connecting sockets are substantially in the same plane as the external surface 310 of the external element, the bent parts 21a, 22a being enclosed between the two elements. In this assembly, the rubber spreads to fill the spaces at the level of the shoulders facing the elements and the connecting sockets and to form sealing joints 17a–17d after vulcanization. A clearance e (FIG. 2) is maintained between the circular edge 334 of the connecting sockets and the shoulders 324 of the internal elements to allow adjustment to the clamping of the two elements. In order to facilitate the distribution of the raw rubber and to ensure a strong joining of the two elements, the connecting sockets have longitudinal peripheral flutes 335, as can be seen in FIG. 3B.

Advantageously, the outer surface 9 of the hose has a conical shape at the level of the flange (over a length ranging from 0.5 to 4 meters, with a growing thickness in the direction of the flange. The conicity is obtained by progressive increase in the layer of rubber 10 between the two sets of plies of the secondary carcass and by the presence of layers of rubber 601, 602 between the plies 61–63 of the second set. The diameter of the plies 61–63 of the second set progressively increases approaching the flange 3 so as to arrive at a diameter greater than that of the internal element 32 of the flange, said plies stopping before the external element 31 of the flange. The first set of plies 64, 65 extends, for its part, into the conical part of the wall with a substantially constant diameter.

Advantageously, the secondary carcass 6 is also fixed to the flange by at least a part of its plies. The bent parts 21a, 22a of the main carcass, interposed between the annular elements of the flange, are bent longitudinally rearward, the longitudinal bent parts 21b, 22b thus formed are interposed between plies of the second set of the secondary carcass, and/or fixed against the latter, over a length ranging, for example, from 300 to 400 mm. By way of example, the longitudinal bent part 22b of the pair of lesser diameter is applied against the internal surface of the ply 63 of lesser diameter of the second set and the longitudinal bent part 21b of the other pair interposes itself between the aforesaid ply 62 and the following ply 63.

The hose further contains longitudinal reinforcements 19 at the level of the flange. These longitudinal reinforcements are formed, for example, by three concentric, longitudinal-reinforcement plies, an upper ply 19a, an intermediate ply 19b and a lower ply 19c, of diameter greater than the main carcass and less than the secondary carcass. Each ply is formed, for example, by textile cords, arranged in a substantially axial manner and embedded in a film of rubber. These three plies are disposed one against the other and joined together by the lower ply 19c with the main carcass and bent with the latter so as to be interposed between the two elements 31, 32 of the flange. Preferably, the reinforcement plies 19a–19c extend as far as the bores of the flanges and stop substantially at the level of the external circular surface 325 of the internal element. The upper ply 19a extends radially outward in an oblique manner and interposes itself between the two plies 64, 65 of the secondary carcass, which extend obliquely inward. Thus, in the present embodiment, the plies of the first set of the secondary carcass are fixed indirectly to the flange, via the longitudinal reinforcements and the main carcass. In constructional variants, some longitudinal-reinforcement plies are joined, on the one hand, to the flange and, on the other hand, between and/or against plies of the main and/or secondary carcass, in which case plies can have diameters greater than those of the plies of the secondary carcass or less than those of the plies of the main carcass.

According to the invention, the external surface 9 of the hose contains indentations 12 or openings on which bores 34*a* or the whole of the bores of the flange emerge. In the example described, the indentations 12 are arranged such that one bore in two is emerging. FIG. 1 represents a longitudinal section of a hose according to the invention at the level of a non-emerging bore 34*b* and FIG. 2 represents a longitudinal section of a same hose at the level of an emerging bore 34*a*. In the case of a hose of 600 mm internal diameter, comprising a flange provided with 20 bores (according to standard ANSI B. 16.5—Class 150), the hose according to the invention will have 10 emerging bores and 10 non-emerging bores distributed alternately.

The non-emerging bores 34*b* have a tapped part, whilst the emerging bores are smooth over the whole of their length. Advantageously, the tapped part of the non-emerging bores is constituted by the second part 323*b* of the bores of the internal element of the flange, such as represented in FIG. 3A. The non-emerging bores 34*b* are obturated by metallic plates 13 welded onto the internal surface 322 of the internal element in order to prevent any infiltration of water into the hose. Of course, a preformed internal element, having emerging holes and dummy holes, can be envisaged.

Figure 4A:
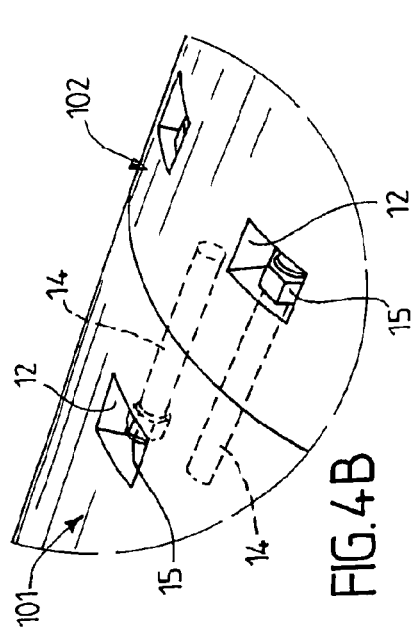
FIG. 4A represents a perspective view of two hoses according to the invention, joined by their connecting flanges.
Figure 4B:
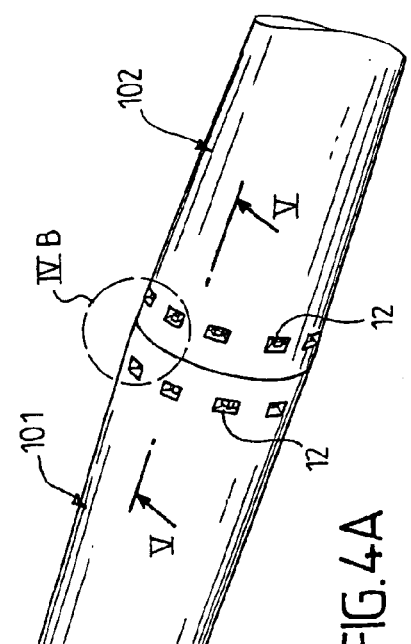
FIG. 4B represents an enlarged view of a part of FIG. 4A.
Figure 5:
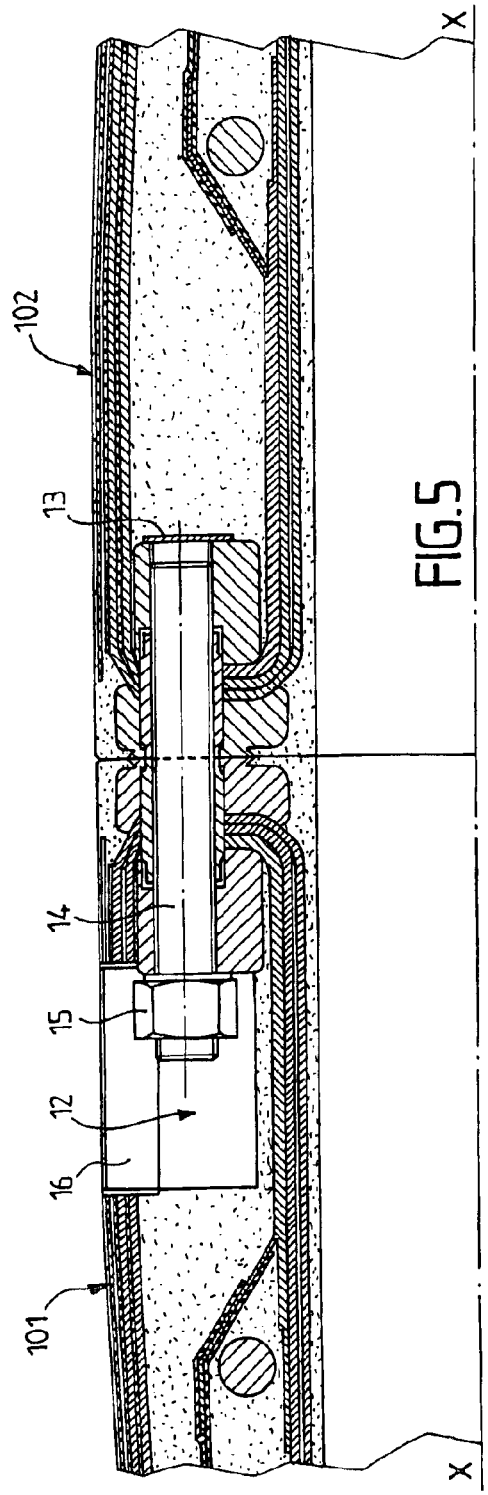
FIG. 5 represents a partial half-view, in axial section along the plane V—V of FIG. 4A, of two connected hoses.

This connecting flange allows hoses to be joined end to end or the hose to be joined to a fixed or mobile installation without the need for an intermediate component. FIGS. 4A, 4B and 5 illustrate the connection of two hoses according to the invention. The connection of two hoses 101, 102 is effected by arranging the non-emerging bores 34*b* of the hoses to face the emerging bores 34*a*, as follows. Threaded rods 14 are screwed into the non-emerging bores 34*b* of the flanges of each hose and the two hoses are then positioned in such a way to allow the prominent portions of threaded rods of one hose to be inserted into the emerging bores of the other hose. Nuts 15 are then screwed onto the ends of the threaded rods positioned in the indentations 12. According to the size of the indentations, the nuts can be positioned in the indentations prior to the complete insertion of the threaded rods into said indentations. The nuts are then screwed manually or mechanically. Preferably, the indentations do not extend beyond the internal circular surface of the internal element of the flange and represent a volume substantially corresponding to the correct volume necessary to allow the nuts to be clamped on the threaded rods.

Advantageously, the external 9 and internal 4 layers of the hose extend beyond the reinforcement carcasses 2, 6 and take up residence in recesses 315, 316 made in the outer surface 310 of the external element of the flange, to form an integrated connecting joint of the hose. The external element contains on its outer surface 310 a first circular recess 315 extending as far as the external circular wall 317, in which the external layer 8 of the hoses take up residence. Similarly, the outer surface 310 contains a second recess 316 extending as far as the internal circular wall 318 of the element, in which the internal layer 4 of the wall takes up residence. The internal and external layers housed in the recesses form an axial excess thickness, visible in FIG. 2, serving as a sealing joint 18*a*, 18*b* for the connection of the two hoses.

Advantageously, the upper part of the vertical rubber walls 121 of the indentations 12 is lined with a metallic strip 16 over a height corresponding to the various plies present at this level of the wall of the hose, namely the plies 61–63 of the second set of the secondary carcass and the longitudinally bent parts 21*b*, 22*b* of the pairs of the main carcass. These plies, which lie flush with the vertical walls 121 of the indentations, are thus protected from the exterior. The strip 16, which has been fixed to the wall of the indentation during vulcanization, rests upon a shoulder 121*a* present on the rubber walls of the indentation, as well as on the internal element of the flange. The upper edge of the sealing strip can come to lie flush with the external surface 9 of the wall of the hose or can be spaced from the latter by a height substantially equal to or less than the thickness of the external layer 8.

The hoses according to the invention, provided at each of their ends with a flange combined with indentations, as previously described, can be connected end to end to constitute a transport line between an oil tanker and a fixed or mobile point, or between two oil installations. For the laying of such lines, the end-to-end hoses can advantageously be wound around a reel. Of course, the ends of the line must be linked to a complementary flange on the tanker or the fixed or mobile point. The line obtained has good strength properties, including at the level of its connection to a fixed point. The hose according to the invention can be used to realize lines of great length. By way of example, in the case of recent drillings of deep-sea oil deposits, referred to as deep "offshore" deposits, at depths sometimes reaching 1000 meters or more, the various drilling wells are linked by flexible hoses to a single oil platform on which the crude oil is pre-processed. The platform is then linked by a transport line to an intermediate storage tanker, which must be positioned outside the zone of the drilling wells and at a safe distance from the platform, which has been fixed at about 1.6 km. A transport line of this length, in particular at the level of its ends, suffers stresses greater than those encountered in traditional lines, previously mentioned, of a maximum length of 300 meters at a depth of about 100 meters. The current solution consists in realizing a line with rigid stainless steel hoses, at a depth of the order of 600 meters. In order to replace a rigid line of this kind of limited diameter and the installation of which is complex and laborious, the hose according to the invention can be used to realize a strong line, easily laid from a reel, said line being able, for example, to be joined to submerged buoys at a depth of 300 meters.

The hose according to the invention can also be used in combination with another flange of the prior art to produce flexible lines, in which case the hose has at one end a flange combined with indentations and at its other end a flange of the prior art such as those described in the aforesaid patent applications.

The hose according to the invention, provided with indentations proximate to the flange to form emerging bores, can be obtained by the following process. With reference to FIGS. 6A, 6B, 7A and 7B, prior to the installation of the flange preceding the curing or vulcanization of the hose, molding cores 17 are fitted against the internal surface 322 of the internal element of the flange, via bores of the flange which are required to be made emerging once the hose is realized. In the exemplary embodiment, ten cores 17 are joined to obtain access to one bore in two. It should be noted that, in FIGS. 6A and 6B, the bores 34*b* which appear between two cores and which will not be emerging are not obturated. It is also feasible to fix a sealing strip prior to the installation of the cores.

Each core 17 has in cross section a substantially trapezoidal shape, the large base 171 of which is orientated radially outward when the core 17 is joined on the flange. One of the small sides perpendicular to the bases 171, 172 of the trapezoidal core forms the surface of the core intended to make contact with the flange. This contact surface 173 possesses a tapped bore 173c, into which a holding bolt inserted through a smooth bore 34a of the flange can be screwed. In the case of a flange such as previously described, the two elements 31, 32 of the flange are pre-joined by means of the connecting sockets 33, maintaining a space between the elements in order subsequently to allow the positioning of the plies, and the cores are then fitted against the internal surface of the internal element. The holding bolts of the cores can in this case also ensure the clamping of the annular elements of the flange in the axial direction during vulcanization. It should be noted that FIGS. 6A and 6B only illustrate the positioning of the cores relative to the internal element of the flange, the cores not being fixed on said element.

The contact surface 173 further has a shoulder 173a, the shape of which is adapted to the radius of curvature of the flange and to the rounded junction between the external circular wall 325 and the internal surface 322 of the internal element. This shoulder 173a allows precise positioning of the cores on the flange. This shoulder defines an upper edge 173b which links said contact surface 173 to the upper surface 171. When the core is joined on the flange, this upper edge 173b is prominent relative to the external circular wall 325 of the internal element. The upper surface 171 of the core preferably has a convex shape, the radius of curvature of which substantially corresponds to that of the outer surface 9 of the hose. This upper surface comes to lie substantially flush with the outer surface of the hose when the flange is installed on the hose. Preferably, the small base 172 of the core is not prominent relative to the internal circular surface 326. In order to form an indentation 12, the volume of which substantially corresponds to the volume necessary to allow fixing of the hose and thus maintain a maximum quantity of rubber at the level of the flange, the core has an overall conical shape in the longitudinal direction, the rear surface 177, opposite to the contact surface 173, being smaller in size than the latter. Moreover, the oblique surfaces 178, 179 of the trapezoidal core are linked to the upper surface 171 by flat surfaces 178a, 178b substantially perpendicular to the small base 172. As illustrated solely in FIGS. 7A and 7B, the small base can have a concave outer shape, possibly forming a continuous surface with the aforesaid oblique walls.

Advantageously, the positioning of the sealing strips 16 is realized by means of the cores 17. The sealing strips have a circumference corresponding to the aforesaid flat parts 178a, 178b, to the upper edge 173b and to the rear surface 177 of the cores and are joined on the cores against these portions. With reference to FIG. 8, the sealing strip 16 preferably has the general shape of a U, the base 164 and the arms of which are intended to come respectively against the upper edge 173b and the flat parts 178a, 178b. The free ends 162,163 of the arms are curved toward each other and are intended to come against the rear surface 177 of the core.

This configuration lends an elasticity to the sealing strip which facilitates its installation on the core, but has the drawback of not lining a part of the wall of the indentation. The metallic plies will be able to be adjusted such that they do not come between the two free ends of the stirrup, the plies will be separated at this level of the wall of the indentation by a thickness of rubber. To ensure the vertical positioning of the strip 16, the flat parts are linked to the upper edge 173b of the contact surface by chamfers 174, said chamfers not extending as far as the upper surface 171 in order to form stops 175, against which the strip rests by its upper edge 161. Moreover, the rear surface has a shoulder 177a serving as a stop for the strip. When the core is joined on the flange, the sealing strip is in contact with the external circular surface 325 of the internal element by the lower edge 165 of its base 164, which has a radius of curvature corresponding to that of the flange. In this embodiment, the upper edge 161 of the strip will be disposed at a distance from the external surface 9 at least equal to the height of the aforesaid stops. In the embodiment illustrated in FIG. 8, the arms 168, 167 linking the base 164 to the free ends 162, 163 have a height which decreases from the free ends to the base. Of course, a strip of constant height is also feasible, by providing notches 169 on the lower edge 165 at the level of the junction of the arms to the base, as illustrated in FIG. 2.

Following adjustment and positioning of the reinforcement plies relative to the two elements of the flange, to the connecting sockets and to the cores, as well as the ones relative to the others, the whole is joined together by vulcanization in the traditional manner. In order to avoid additional cuts, some raw rubber, in the form of film, for example, can be previously arranged between the cores 17 prior to the flange being fitted onto the wall of the hose. The holding bolts of the cores are then unscrewed and the cores withdrawn, leaving in the indentations thus formed the sealing strips which have stuck to the walls of the indentations during vulcanization. In order to facilitate the extraction of the cores, tapped bores 171a can be provided on the upper surfaces 171 of the cores. The cores can thus be extracted by pulling on a tool screwed in said bores. Moreover, the cores can be previously lined with an antiadhesive to prevent them from attaching to the rubber during vulcanization.

Although the invention has been described in connection with a particular embodiment, it is obvious that it is in no way limited thereto and that it comprises all the technical equivalents of the means described, as well as combinations thereof provided they fall within the scope of the invention. By way of example, the distribution of the emerging and non-emerging bores can vary. Moreover, it can be envisaged to provide only emerging bores, accessible by separate indentations or by a single annular indentation.

What is claimed is:

1. A flexible hose (1), the elastomer wall (1a) of which is reinforced by at least one main carcass (2) containing pliable cords and which comprises at one at least of its ends an annular connecting flange (3), provided, from its transversely external end surface, with longitudinal bores, to which flange at least the main carcass is fixed, said flange having an outer diameter less than or equal to the outer diameter of the wall of the hose proximate to the flange, which hose is characterized in that the flange comprises bores (34a), "emerging" bores, which emerge on one or more indentations (12) made on the outer surface (9) of the wall of the hose and the dimensions of which allow at least one externally accessible coupling means (15) to be housed there, for connecting hoses end to end without any intermediate component interposed between their respective flanges.

2. The hose as claimed in claim 1, characterized in that each emerging bore (34a) emerges on a separate indentation (12).

3. The hose as claimed in claim 1, characterized in that the flange comprises "non-emerging" bores (34b), which do not emerge on an indentation and which are tapped over at least a part thereof for the screwing of a complementary threaded rod (14) of the aforesaid coupling means (15), the emerging bores (34a) being untapped.

4. The hose as claimed in claim 3, characterized in that the emerging bores (34*a*) and the non-emerging bores (34*b*) are alternately and peripherally distributed over the external end surface (310) of the flange.

5. The hose as claimed in claim 4, characterized in that the non-emerging bores (34*b*) contain a bottom separating said bores from the wall of the hose and constitute dummy bores of the flange.

6. The hose as claimed in claim 1, characterized in that at least a part of the walls (121) of the indentations (12) is lined with a sealing strip (16) by which contact of a carcass (2,6) with the exterior can be prevented.

7. The hose as claimed in claim 1, characterized in that the main reinforcement carcass (2) is formed by one or more pairs (21,22) of concentric plies radially spaced by layers of elastomer (3), each pair being constituted by two elastomer plies and parallel metallic cords orientated obliquely in the opposite direction in the one and the other ply such as to form angles of 20° to 70° relative to the axis (X) of the hose.

8. The hose as claimed in claim 7, characterized in that it comprises a secondary reinforcement carcass (6) of greater diameter than the main carcass (2) and radially spaced toward the outside of the latter by a layer of elastomer (7), said secondary carcass comprising concentric plies (61–67) of elastomer and of metallic and/or textile cords, joined directly to one another and/or spaced by layers of elastomer (10), the cords of the main carcass forming angles substantially equal to the angle of equilibrium, while the cords of the secondary carcass form angles between 20° and 70°.

9. The hose as claimed in claim 8, characterized in that the flange (2) comprises at least two axially joined annular elements, a longitudinally external element (31) and a longitudinally internal element (32), each provided with coaxial holes forming at least a part of the aforesaid bores (34*a*, 34*b*), at least the internal element possessing an internal diameter less than or equal to the main carcass (2) and at least the main carcass being radially bent, the radial part (21*a*, 22*a*) thus bent being interposed and fixed between the two elements of the flange.

10. The hose as claimed in claim 9, characterized in that it has, close to the flange (2), a conical exterior shape, with an increase in thickness in the direction of the flange, obtained by increasing the thickness of an elastomer layer and/or insertion of an elastomer layer and/or of plies between plies of a carcass.

11. The hose as claimed in claim 9, characterized in that the radial bent part (21*a*, 22*a*) of the main carcass extends radially beyond at least the longitudinally internal element (32) of the flange and is bent longitudinally at a distance from the end of the hose, at least a part of the plies which constitute it being interposed between the plies of the secondary carcass so as to fix these latter to the flange via the plies of the main carcass.

12. The hose as claimed in claim 9, characterized in that it comprises, close to the flange (3), longitudinal-reinforcement plies (19), comprising cords arranged substantially parallel to the axis (X) of the hose, said plies being joined to the flange and to the main carcass (2) and/or to the secondary carcass (6).

13. The hose as claimed in claim 12, characterized in that the reinforcement plies have diameters greater than that of the plies of the main carcass (2) and less than that of the plies of the secondary carcass (6) and are joined together and joined to the main carcass, at least one of the plies (19*c*) having its double-bent end connected to at least one ply (64, 65) of the secondary carcass.

14. The hose as claimed in claim 9, characterized in that the flange comprises tubular elements (33) inserted at least partially in coaxial holes of the longitudinally internal and external elements (31,32) and the external surfaces (330) of which are lined at least partially with elastomer to ensure the leak-tightness of the flange at the level of said bores and to guarantee that the various elements of the flange are strongly joined.

15. The hose as claimed in claim 9, characterized in that it comprises metallic rings (11) or a helical metallic armoring embedded in the layer of elastomer (7) contained between the main carcass (2) and the secondary carcass (6).

16. A process for obtaining a flexible hose according to claim 1, characterized in that it comprises a step for fixing cores (17) against the transversely internal surface (322) of the flange (3) at the level of at least certain of the longitudinal bores, a step for positioning and adjusting the flange at the end of the hose, said bores being prominent relative to the outer surface of the wall, made of crude non-vulcanized elastomer, of the hose, or having a surface lying substantially flush with said outer wall surface, and a step for removing these cores after the elastomer has been vulcanized.

17. The process as claimed in claim 15, characterized in that it comprises a step for fitting the sealing strip (16) onto the cores (17), said strips remaining stuck to the vulcanized elastomer wall of the indentations (12) after the cores are removed.

* * * * *